US010635656B1

(12) United States Patent
Clark et al.

(10) Patent No.: US 10,635,656 B1
(45) Date of Patent: *Apr. 28, 2020

(54) EXTRACT, TRANSFORM, AND LOAD APPLICATION COMPLEXITY MANAGEMENT FRAMEWORK

(71) Applicant: United Services Automobile Association (USAA), San Antonio, TX (US)

(72) Inventors: Larry W. Clark, San Antonio, TX (US); Jason Paul Hendry, Selma, TX (US); Mark Steen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/924,715

(22) Filed: Mar. 19, 2018

Related U.S. Application Data

(63) Continuation of application No. 15/134,627, filed on Apr. 21, 2016, now Pat. No. 9,922,072, which is a continuation of application No. 14/242,476, filed on Apr. 1, 2014, now Pat. No. 9,323,816, which is a continuation of application No. 13/341,433, filed on Dec. 30, 2011, now Pat. No. 8,688,625.

(60) Provisional application No. 61/428,984, filed on Dec. 31, 2010.

(51) Int. Cl.
  *G06F 17/30* (2006.01)
  *G06F 16/23* (2019.01)
  *G06F 16/25* (2019.01)
  *G06F 16/2458* (2019.01)

(52) U.S. Cl.
  CPC ...... *G06F 16/2365* (2019.01); *G06F 16/2474* (2019.01); *G06F 16/254* (2019.01)

(58) Field of Classification Search
  CPC .................................................. G06F 17/30563
  USPC ................................................. 707/602, 607
  See application file for complete search history.

(56) References Cited

U.S. PATENT DOCUMENTS

| | | | |
|---|---|---|---|
| 8,131,686 B2 | 3/2012 | Lakshmanachar et al. | |
| 8,214,324 B2 | 7/2012 | Joerg et al. | |
| 8,401,993 B2 | 3/2013 | Kumar et al. | |
| 8,688,625 B1 * | 4/2014 | Clark | G06Q 10/00 707/602 |
| 9,323,816 B1 * | 4/2016 | Clark | G06Q 10/00 |
| 9,922,072 B1 | 3/2018 | Clark et al. | |

(Continued)

*Primary Examiner* — Hung T Vy
(74) *Attorney, Agent, or Firm* — Fish & Richardson P.C.

(57) ABSTRACT

Extract, transform, and load application (ETL) complexity management framework systems and methods are described herein. The present disclosure describes systems and methods that reduce the complexity in managing ETL flow and correcting errant data that is subsequently identified. One or more methods include defining an ETL job definition, defining a data asset definition, defining a data asset dependency definition, receiving an ETL flow to provide execution of one or more ETL flow steps, providing retrieval of data from a source data asset, applying a data control to the source asset data, and producing an ETL job registration, a data asset status, a latest asset available date, a data asset consumer identifier, and a target data asset based on at least one of the ETL job definition, the data asset definition, the data dependency definition, and the source asset data.

27 Claims, 9 Drawing Sheets

(56) References Cited

U.S. PATENT DOCUMENTS

| | | |
|---|---|---|
| 2007/0008985 A1 | 1/2007 | Lakshmanamurthy |
| 2007/0136324 A1* | 6/2007 | Xu ................. G06F 16/254 |
| 2008/0092112 A1* | 4/2008 | Jin ................ G06F 16/2448 |
| | | 717/106 |
| 2008/0243785 A1* | 10/2008 | Stading ............ G06F 16/9535 |
| 2009/0282089 A1* | 11/2009 | Lakshmanachar ...... G06F 16/10 |
| 2010/0281061 A1* | 11/2010 | Chen ................ G06F 16/215 |
| | | 707/794 |
| 2011/0047525 A1 | 2/2011 | Castellanos et al. |
| 2011/0055147 A1 | 3/2011 | Joerg et al. |
| 2011/0161946 A1 | 6/2011 | Thomson et al. |

\* cited by examiner

EXTRACT, TRANSFORM, AND LOAD APPLICATION COMPLEXITY MANAGEMENT FRAMEWORK

CROSS REFERENCE TO RELATED APPLICATIONS

This application is a continuation of U.S. patent application Ser. No. 15/134,627, filed Apr. 21, 2016, now U.S. Pat. No. 9,922,072, which is a continuation of U.S. patent application Ser. No. 14/242,476, filed Apr. 1, 2014, now U.S. Pat. No. 9,323,816, which is a continuation of U.S. patent application Ser. No. 13/341,433, filed Dec. 30, 2011, now U.S. Pat. No. 8,688,625, which claims priority to co-assigned U.S. Provisional Patent Application No. 61/428,984, filed Dec. 31, 2010, each of which are incorporated herein by reference in their entirety.

TECHNICAL FIELD

The present disclosure relates to systems and methods for utilizing an extract, transform, and load application (ETL) complexity management framework.

BACKGROUND

An extract, transform, and load software application (ETL) enables companies to move data from one or more data resources, reformat the data, clean it up, and load it into another resource (e.g., one or more databases, such as a data mart or a data warehouse). Typically an ETL application is useful where a company has data about a subject that is being used by different software applications or on different systems and the data is in multiple formats or where data is being migrated from one software application to another and the data structures are different.

For instance, a customer service system may store a customer's data in one way, while an accounting system may store data about the same customer differently. For example, the category "female" might be represented in three different systems as F, female, and 0. An ETL application can recognize that these entries mean the same thing and convert them to a target format which may be one of those three formats or may be something different.

However, conversion errors may occur wherein the data when used provides erroneous results, for example. Due to the large amount of data typically converted in ETL processes; the management of the data is often complex and such errors may be difficult to identify.

DETAILED DESCRIPTION

Extract, transform, and load application (ETL) complexity management framework systems and methods are described herein. For example, one or more methods include defining an ETL job definition, defining a data asset definition, defining a data asset dependency definition, receiving an ETL flow to provide execution of one or more ETL flow steps, providing retrieval of data from a source data asset, applying a data control to the source asset data, and producing an ETL job registration, a data asset status, a latest asset available date, a data asset consumer identifier, and a target data asset based on at least one of the ETL job definition, the data asset definition, the data dependency definition, and the source data asset. Other systems and methods are disclosed herein.

Use of the systems and methods described herein can be beneficial, for example, because they allow an ETL process to be monitored, dependencies between data assets can be identified, tracked, and/or managed, errors can be identified, data assets having errors and/or that may be affected by errors can be rolled back, and/or data assets can be rolled forward once an error has been repaired, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of computing devices" can refer to one or more computing devices.

Figure 1:
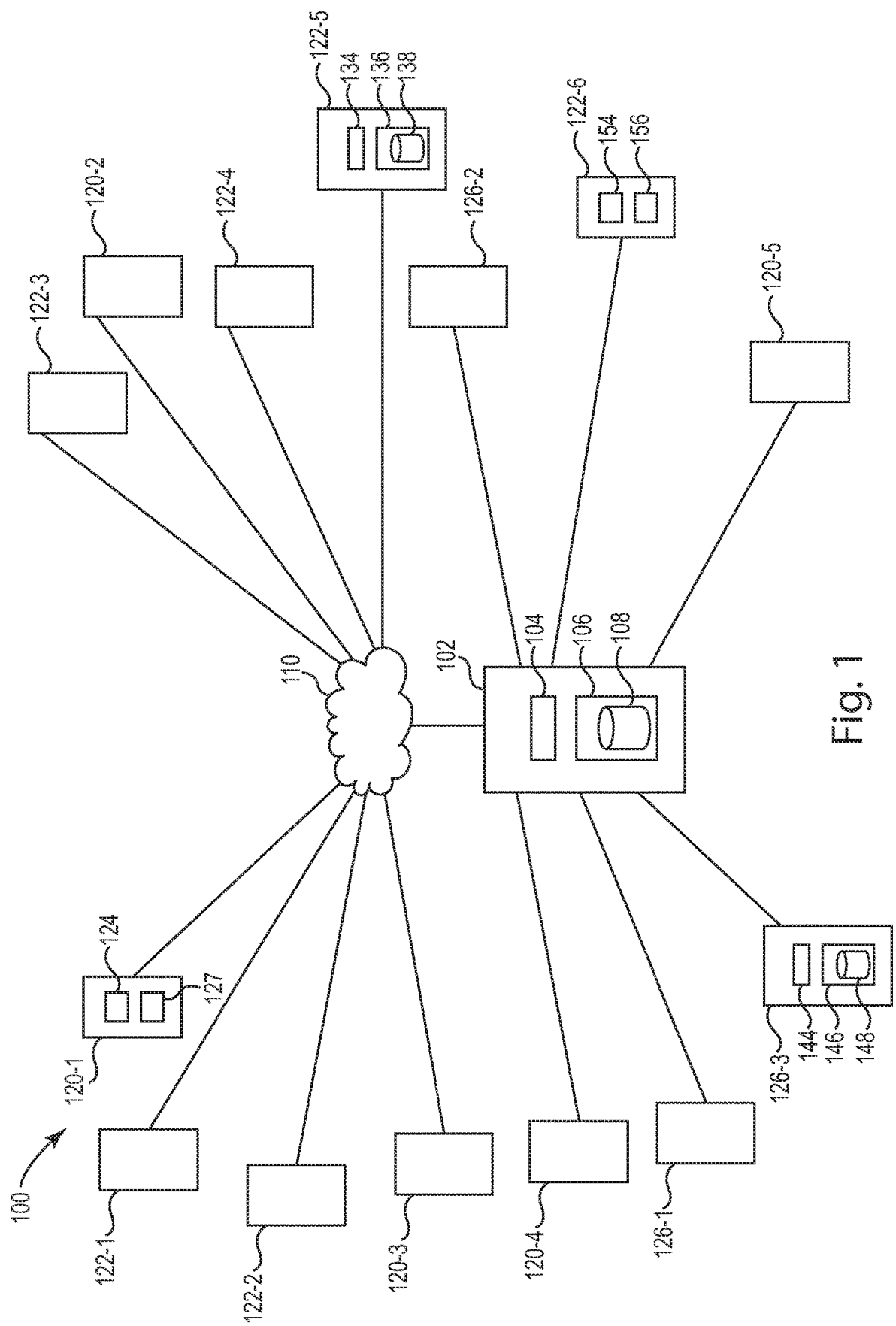
FIG. 1 illustrates a system that can be used in accordance with one or more embodiments of the present disclosure.

FIG. 1 illustrates a system that can be used in accordance with one or more embodiments of the present disclosure. In the embodiment illustrated in FIG. 1, the system 100 is provided for utilizing an extracting, transforming, and loading complexity management framework.

The system 100 includes a number of computing devices for extracting, transforming, and/or loading data from one data store to another. For example, the system includes a computing device 102 having one or more processors (e.g., processor 104) and memory 106. In some computing devices, the memory can contain a database 108.

In the embodiment of FIG. 1, the device 102 can include executable instructions to provide a user interface to allow a user to execute instructions to accomplish the ETL process. These instructions can be, for example, stored in memory 106 and executed on processor 104.

The user interface may, for example, be a web based user interface. This can be beneficial for a number of reasons. For example, the web base can allow the interface to be accessed remotely from the rest of the system via a network (e.g., such as the Internet). The web interface also can be utilized to make the interface platform (i.e., operating system) neutral, thereby allowing a user on one software platform (e.g., Windows) to be able to analyze data from another platform (e.g., UNIX), in some embodiments.

The processor 104 can be utilized to execute instructions that can be stored in memory 106 or on other computing devices or storage mediums connected thereto. Memory 106 can also be utilized to store data thereon. Data can be used or analyzed through use of instructions that are executed on a processor (e.g., processor 104) of the system 100.

The computing device 102 can be connected to other computing devices of the system 100 directly (through a wired or wireless connection) or indirectly (through a network as described in more detail herein). For example, in the system 100 of FIG. 1 the computing device 102 is connected indirectly to multiple other computing devices 120-1, 120-2, 120-3, 122-1, 122-2, 122-3, 122-4, and 122-5 via a network 110.

However, the computing devices may be connected via a wired or wireless connection directly to each other or indirectly through a network, as shown or through one or more other devices. For example, in the system 100 of FIG. 1 the computing device 102 is connected directly to multiple other computing devices 120-4, 120-5, 122-6, 126-1, 126-2, and 126-3.

As stated above, one environment where an ETL may be utilized, for example, is on systems where data is being moved from a computing device having one data format to another computing device having another data format. In the embodiment illustrated in FIG. 1, the other computing devices of the system are grouped into three groups, representing computing devices that may have different formats.

A first group includes computing devices 120-1, 120-2, 120-3, 120-4, and 120-5. A second group includes 122-1, 122-2, 122-3, 122-4, 122-5, and 122-6. A third group includes 126-1, 126-2, and 126-3. It may be that data is being moved or copied from computing devices on the first and second groups that may have the same or different formats, and placed into a data store in the third group that has a data format different from that used on the first and second groups. In such instances, an ETL can be used to make that transfer of the data.

Although not shown, it should be noted by the reader that the other computing devices (e.g., computing device 120-5) of the system 100 can also have one or more processors (e.g., 104, 124, 134, 144, and 154), memory, and/or databases provided thereon and can be similar to those described with respect to the one or more processors 104, memory 106, and databases 108 in computing device 102. Accordingly, data can be stored thereon and ETL process can be run on such devices.

Memory (e.g., memory 106, 127, 136, 146, and/or 156) can be a non-transitory machine readable medium that provides volatile or nonvolatile memory. The memory can also be removable, e.g., portable memory, or non-removable, e.g., internal memory. For example, the memory can be random access memory (RAM) or read-only memory (ROM).

Memory can, for example, be dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory (e.g., memory 106) is illustrated as being located in a computing device (e.g., computing device 102), embodiments of the present disclosure are not so limited. For example, memory can also be located in a memory device (e.g., not a computing device) but is connected to a computing device. In some embodiments, the memory can be internal or external to a computing resource and can enable computer readable instructions to be uploaded and/or downloaded over a network, such as the Internet, or another wired or wireless connection to and/or from one or more computing devices.

Memory can store executable instructions, such as, for example, computer readable instructions (e.g., software). One or more processors (e.g., processor 104) can execute the executable instructions stored in memory.

The system can also include a number of databases (e.g., 108, 138, and/or 148). Such databases are also forms of memory, and are typically used to store data, but are not limited to storing data therein.

In some embodiments, instructions and/or data can be communicated via a network 110, such as, for example, a wide area network (WAN) such as the Internet, a local area network (LAN), a personal area network (PAN), a campus area network (CAN), or metropolitan area network (MAN), among other types of networks to other devices of the system.

As used herein, a "network" can provide a communication system that directly or indirectly links two or more computers and/or peripheral devices and allows users to access resources on other computing devices and/or exchange messages with other users. A network can allow users to share resources on their own systems with other network users and/or to access information on centrally located systems and/or on systems that are located at remote locations.

A network may provide connections to the Internet and/or to the networks of other entities (e.g., organizations, institutions, etc.). Users may interact with network-enabled software applications to make a network request, such as to get a file from other network resources. For instance, applications may also communicate with network management software, which can interact with network hardware to transmit information between devices on the network.

Through use of such resources, an ETL application can be executed on one or more computing devices to extract, transform, and load data from one or more first computing devices to one or more second computing devices of the system. Although discussed with respect to a first and second group of computing devices, any number of computing devices or groups of computing devices could be utilized. For example, a single computing device may even have the need for an ETL to extract data from one application, transform the data, and load the data into a database for use by another application on the single computing device.

Figure 2:
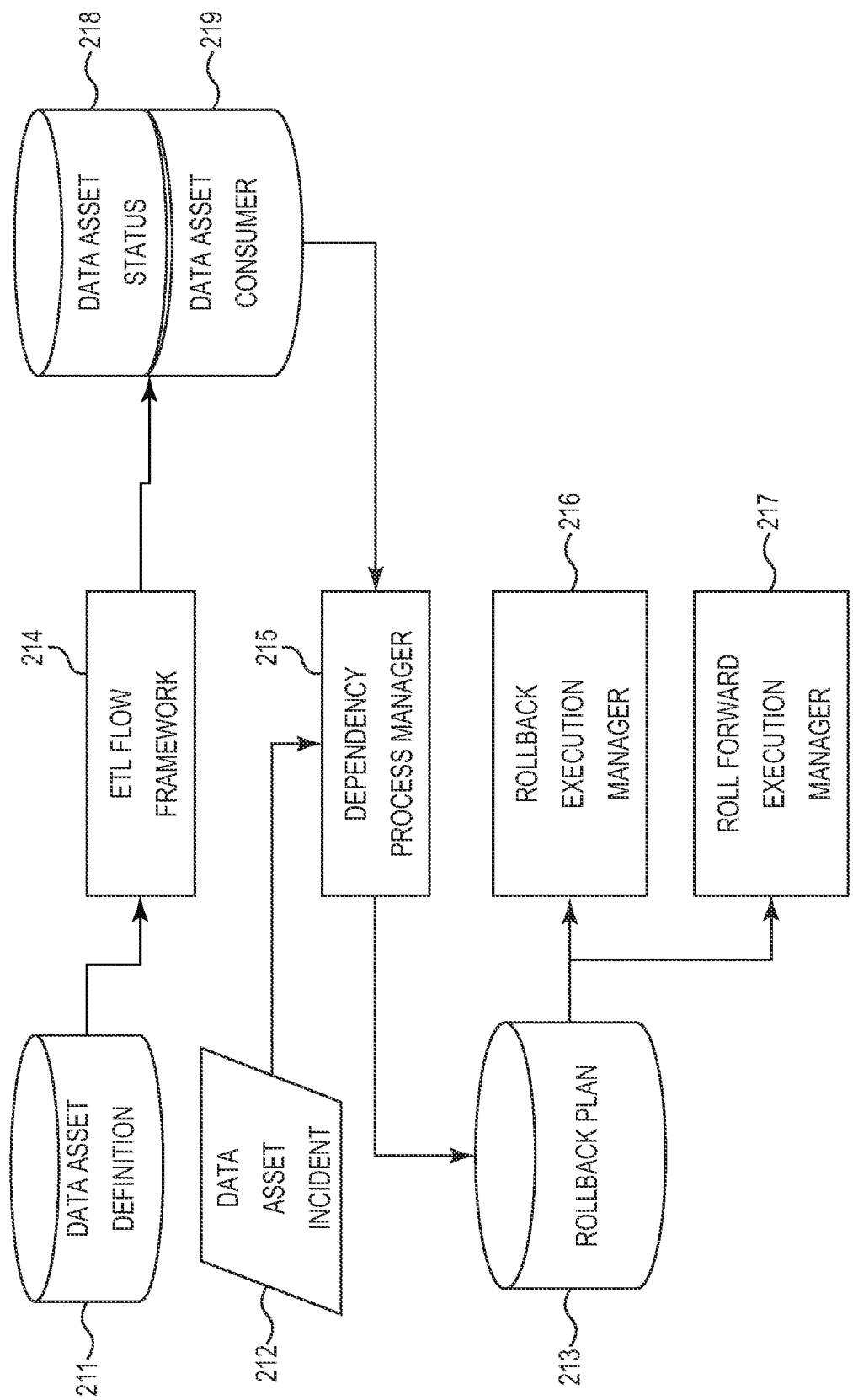
FIG. 2 illustrates an ETL complexity management flow according to one or more embodiments of the present disclosure.

FIG. 2 illustrates an ETL complexity management flow according to one or more embodiments of the present disclosure. In such an embodiment, the ETL flow framework 214 receives information from one or more data asset definitions 211. The ETL flow framework 214 can, for example, standardize controls and/or flows for ETL jobs.

The framework can be used to simplify many of the operational details of ETL execution. For example, it can be responsible for ETL job registration, standard controls, job restart/re-initialization, error handling, and/or dependency management, among other functions. These functions will be discussed in more detail below.

Some embodiments provide the ability to roll back changes that have been made to the system when an error is identified. The roll back has to do with items that are affected by the error.

For example, in the embodiment illustrated in FIG. 2, a dependency process manager 215 can identify or receive information regarding a data asset incident 212 (e.g., an error related problem that needs to be fixed). Dependency process management can be an initial phase of a data asset roll back capability.

The manager can utilize information from various locations within the system. For instance, information can be obtained regarding a data asset status 218 and/or a data asset consumer 219 of a particular data asset as well as from the data asset incident 212 to identify connections between various data assets.

In some implementations, a data asset version may be discovered to have an error several weeks after it was consumed. The dependency process manager 215 can be utilized to provide a plan for roll back 213 of the consumers (i.e., target data assets) of a data asset based on the dependencies of the assets.

A roll back plan can, for example, describe the steps necessary to completely roll back errant data from any consumers of the data. This may include, for example, any number of consumers of the subsequent data. The steps may involve removal of subsets of data from target data assets which consumed the errant data, among other items.

In some such embodiments, a roll back execution manager 216 can be provided. This functionality can be used to manage the roll back of data assets when an error has been identified. Such a manager can, for example, execute the actual roll back of all consumers of the data asset. Based on the versioning strategies of the consumers of the data asset, the framework may be capable of identifying and rolling back multiple subsequent versions of the consumers.

The embodiment illustrated in FIG. 2 also includes a roll forward execution manager 217. Such a functionality can, for example, replace one or more data asset versions that had been rolled back with a corrected version of the errant data asset.

Figure 3:
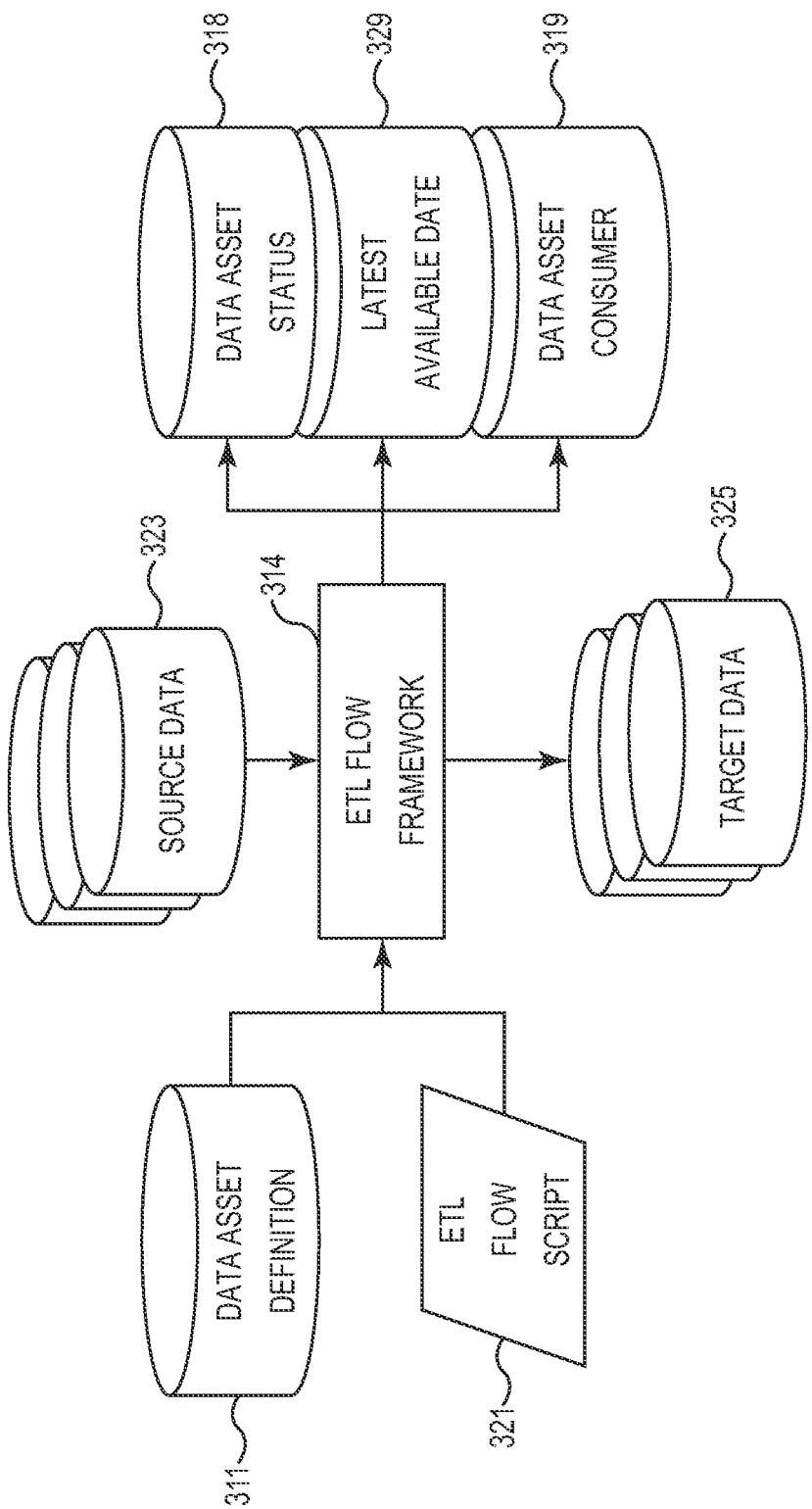
FIG. 3 illustrates an ETL flow framework according to one or more embodiments of the present disclosure.

FIG. 3 illustrates an ETL flow framework according to one or more embodiments of the present disclosure. In this illustration, the ETL flow framework is shown in more detail including resources and targets of the information provided by the framework 314.

In the embodiment illustrated in FIG. 3, information can be received from a data asset definition 311, an ETL flow script 321, and/or from source data 323. An ETL flow script 321 can, for example, be specified using an XML file which is found in a directory (e.g., flowPath) using a file name, such as:

flowName.xml

Such an XML file can, for example, contain steps of a process which can be executed. The steps can be performed in any suitable order, for example, in some embodiments, the steps can be executed in order from top to bottom. In such embodiments, the file can, for example, contain steps used to specify source and target data assets as well as the commands and/or jobs used to produce, modify, and/or control those assets.

Source data 323 can, for example, be data from flat files, database tables, or other datasets. If the source data is understood by the framework, it can be defined to a data asset definition resource 311 and have status information in a data asset status resource 318. Source data is used, for example, to populate target data.

A data asset status resource 318 can, for example, be a runtime populated table. In such an embodiment, each time an ETL job adds (or updates) a set of records in a particular data asset, an entry is created in this table for the data asset.

For example, the resource can start off being populated with minimal data with either a "Not started" or "WIP". Once the processing completes, the data asset status entry can be updated with the applicable runtime summary run statistics (e.g., Success Row Counts, Insert Row Count, Defaulted Data Attribute Count) and the data asset version status record can get updated to indicate the version is "Available".

In some embodiments, a latest available date resource 329 can be provided. For example, a latest available date resource can be a table that, for example, can include information about the status of assets so that a selection of the latest available asset can be made.

For instance, the information can include a data asset identifier (e.g., name), an ETL identifier (e.g., number), a latest available date (e.g., date asset became available to the system), an asset effective date (e.g., date of the data in this version), and/or an asset active indicator (e.g., indicator regarding with data should be used or is valid or invalid, etc.), among other latest available asset information that may be useful to a user of the ETL complexity management framework and/or useful to the functioning of the framework.

In some embodiments, a data asset consumer resource 319 can be provided. For example, such a resource can record the consumption of source data assets and the corresponding target data assets produced by each ETL job run. Such information can be utilized, for example, in the roll back and/or roll forward processes as discussed herein.

In some embodiments, a target data resource 325 can be provided. For example, target data can be produced by the framework 314. It can, for example, be data from flat files, database tables, or other datasets. The target data can be defined to the data asset definition resource and have status information in the data asset status resource.

Figure 4:
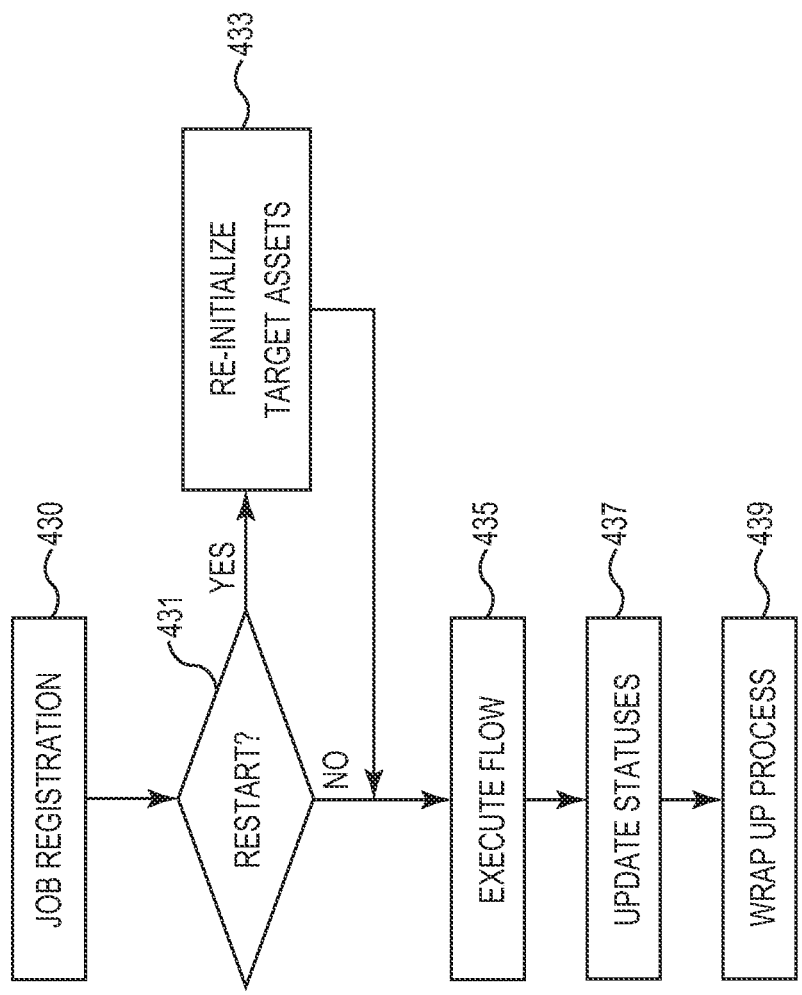
FIG. 4 illustrates an ETL flow framework process according to one or more embodiments of the present disclosure.

FIG. 4 illustrates an ETL flow framework process according to one or more embodiments of the present disclosure. In such an embodiment, a job registration resource 430 is referenced to determine that status (restart—yes or no at 431) of a job within the system.

In the embodiment of FIG. 4, if it has been determined that the job is being restarted, then the target assets may be re-initialized, at 433. For instance, it may sometimes be necessary to re-run a job due to errors. These features allow the re-use of ETL job registration and/or dependency information. For example, as illustrated in FIG. 4, a restart may cause targets to be re-initialized.

In some such embodiments, for example, after failure of an ETL flow, when the job is restarting, the ETL flow framework can recognize that the job has been restarted and can perform some initialization steps to clean up any data that may have been modified during the failed execution. For example, any rows inserted can be deleted and any end dates or current flag updates made during the failed run can be reversed before any other steps are executed.

Three types of reinitializations that can be supported, for example, are: by deleting rows in target assets based on ETL number, by bypassing a reinitialization step and proceed to execute flow steps, and by custom command.

Deleting rows in target assets based on ETL number or example, can, for example, be based on the asset information and the ETL number, deletion (or updating) of rows for the restarted job's ETL number can be done.

Bypassing a reinitialization step and proceed to execute flow steps can, for example be accomplished by having the ETL job itself handle a restart. An example of this would be a job that does an existence check against the target before inserting new records.

For more complex processing, a custom command may be specified to prepare for a restart. This command can, for example, be executed just like an ETL flow command step and, therefore, no validation other than successful completion of the command need be performed in such an embodiment.

In the embodiment of FIG. 4, the flow also includes an execute flow block, at 435. This can, for example, be a point at which a specified ETL flow script is executed.

Such an ETL flow script can, for example, specify items such as source prep assets, understood source data assets, and target assets. Source prep assets are source data assets that are not already known to the system. Source prep assets can, for example, be flat files or data from operational databases. The understood source data assets can, for example, be defined to the data asset definition resource and have a status in the data asset status resource. In some embodiments, controls (e.g., audit count check) can be executed for the source data assets.

Target data assets can, for example, be produced by execution flow 435. An ETL Flow Script (e.g., flow script 321) can specify a target command to be executed to produce one or more target data assets. In some embodiments, controls (e.g., threshold check) can be executed for the target data assets.

As used herein, source prep assets are assets created from a source prep process. Source prep assets behave like a target asset, except that some extra processing, such as archiving, can be automatically performed for a source prep asset. In some embodiments, a source prep and a target step should not be in the same job flow.

In the embodiment of FIG. 4, the flow also includes an update statuses block, at 437. In such an embodiment, for each target asset or source prep asset, the update statuses functionality can update the data asset status and data asset consumer resources. Additionally, for data assets, for example, participating in business intelligence, the latest available date resource can be updated.

In the embodiment of FIG. 4, the flow also includes a wrap up process block, at 439. In such an embodiment, a wrap up process can, for example, include cleaning up temporary files and/or executing a wrap up job step within the system.

Figure 5:
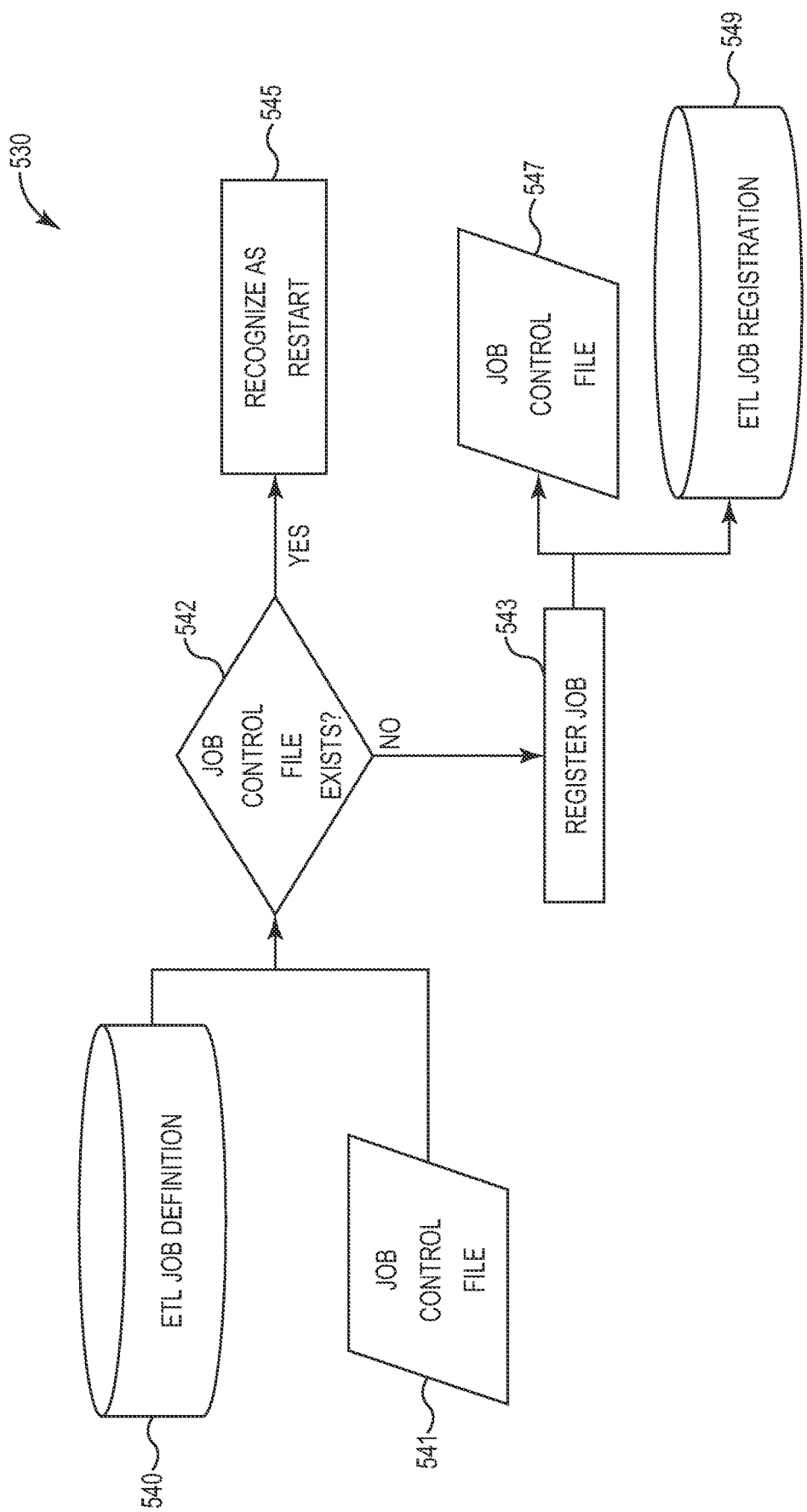
FIG. 5 illustrates an ETL job registration process according to one or more embodiments of the present disclosure.

FIG. 5 illustrates an ETL job registration process according to one or more embodiments of the present disclosure. In the embodiment of FIG. 5, an example of a job registration process 530 (e.g., job registration 430 of FIG. 4) is discussed in additional detail.

An ETL job definition resource is provided at 540. This resource, for example, can include information about the job such as a job identifier (e.g., name), a classification code (e.g., standard ETL, reconciliation, synchronization, initial load, error processing, infrastructure, etc.), and job description, an application identifier (e.g., name), and/or an owner identifier (e.g., name) among other job related information that may be useful to a user of the ETL complexity management framework and/or useful to the functioning of the framework.

A job control file is provided at 541. This resource, for example, can be created by the ETL flow framework and can, for example, be used to determine whether it is necessary to restart an ETL flow job.

At 542, a determination as to whether a job control file exists. If a job control file exists, then the system can recognize that a restart has occurred, at 545. If a job control file does not exist, then the job can be registered at 543 and a job control file 547 can be created.

Figure 6:
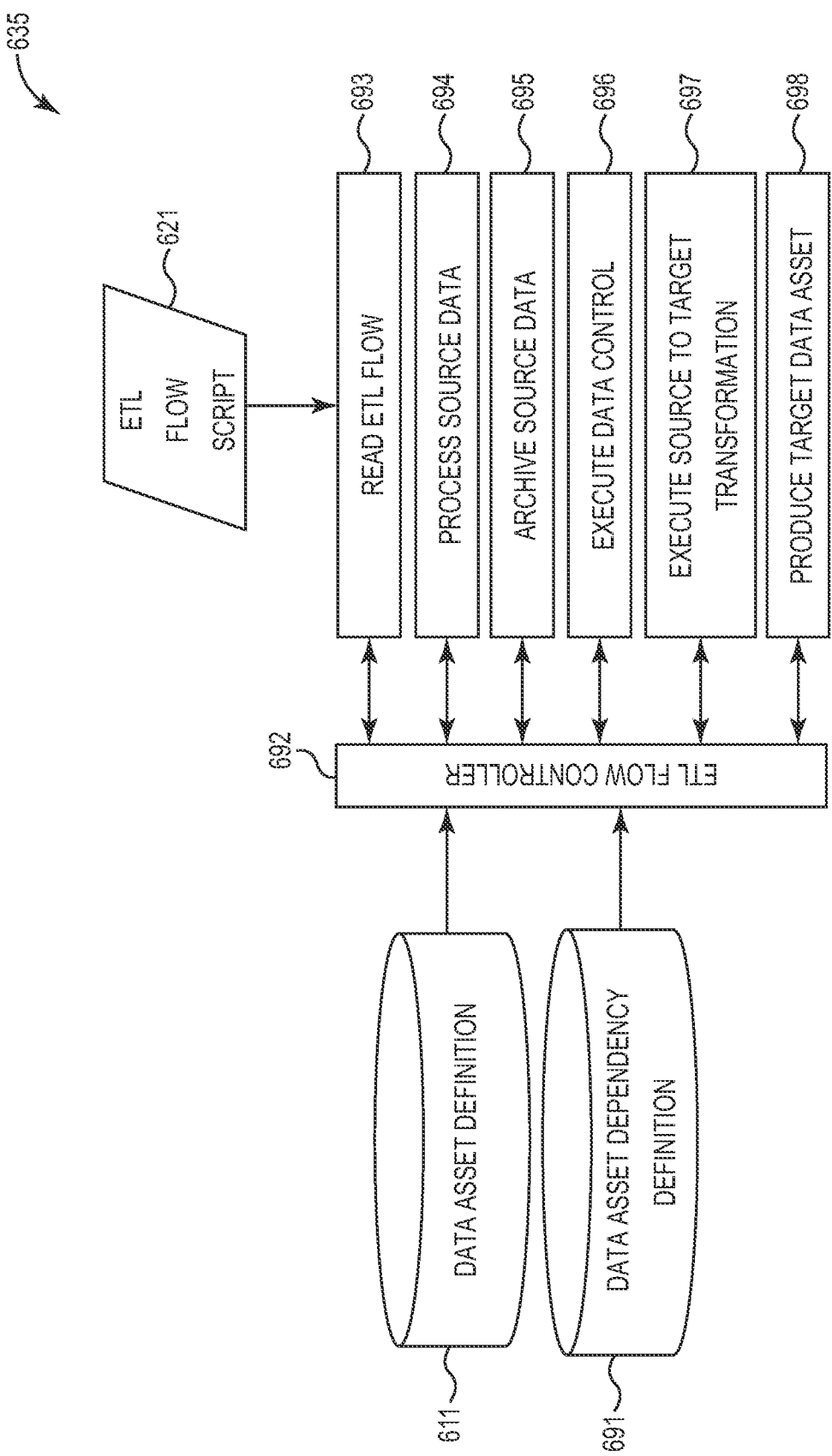
FIG. 6 illustrates an ETL flow execution according to one or more embodiments of the present disclosure.

In some embodiments, each job in the ETL complexity management framework system has to have an ETL number which can be used to track what is done by a particular job. If the flow is being restarted due to a prior failure, the same ETL number can be used for the execution. Otherwise, a new ETL number can be generated and recorded in a runtime job registration resource (e.g., table). In such embodiment, the job's status can, for example, be set to RUNNING. A temporary job control file can be created in a job control directory. Its name can, for example, be jobname_odate.txt An ETL job registration functionality is provided at 549. This functionality, for example, determines whether a job is initially executing or restarting. If it is initially executing, it generates an ETL number and registers the job in the job registration resource. The ETL number can, for example, be included in data for the job, allowing easy recognition of which rows were based on which job occurrence FIG. 6 illustrates an ETL flow execution according to one or more embodiments of the present disclosure. In the embodiment of FIG. 6, an example of a flow execution process 635 (e.g., flow execution 435 of FIG. 4) is discussed in additional detail.

In the embodiment of FIG. 6, an ETL flow controller 692 can be utilized to use information from the data asset definition resource 611 and/or the data asset dependency definition resource 691 and an ETL flow script 621 to provide a variety of functions.

A data asset definition resource can be used, for example, to describe data assets understood by the framework. Data assets can be, for example, flat files, database tables, or other datasets. Information in the table includes a data asset identifier, its physical properties (e.g., file path and file name, database table name), data asset structure type, versioning type (i.e., how it is versioned), data asset refresh frequency (e.g., daily, weekly), retention policy (e.g., no purge, date-based purge, number of version to keep), among other data asset related information that may be useful to the ETL complexity management framework system.

A data asset dependency resource can, for example, include information about the dependency of assets such as the relation between a job definition and the assets the job uses as sources and/or targets. For example, the information can include target data asset identifier (e.g., name), source data asset identifier (e.g., name), job identifier (e.g., name), data asset version identification type (e.g., mechanism by which a version identifier can be identified or referenced), relationship to other source or target data assets, among other data asset dependency information that may be useful to a user of the ETL complexity management framework and/or useful to the functioning of the framework.

In the embodiment of FIG. 6, the ETL flow script is read to receive the steps of the flow used to control an ETL job at 693. Source data can be processed for use in these steps, at 694.

Source data can be data suitable for source prep or an understood source data asset which is already known to the framework. This process may cause the framework to archive the source data and/or execute data controls, in some embodiments, such as at 695 in FIG. 6.

Source data archive and purge can be accomplished for example where the source prep applications (i.e., ones that introduce data into the ETL complexity management framework system) using the framework will archive source data to avoid having to go back to the source system if a subsequent problem arises. This archived data can be periodically purged, in some embodiments.

A data control functionality can be used to apply common functions against data assets for the purpose of ensuring data asset quality, such as at 696 in the embodiment of FIG. 6. Some types of controls include:

File Identity Check: Checks for situations where the same extract file was provided instead of a new one.

Audit Count Check: Compares the number of records that were provided with the actual number of records received.

Threshold Data Check: Compares the number of records received to a threshold range. If the number of records is outside that range, there is a possibility of an error (e.g., Operational Application may be failing to produce the needed records).

In some embodiments, it may be useful to transform data from its source data format to a target data format, such as at 697 of FIG. 6. This can be accomplished using one or more ETL transformation tools.

In some embodiments, a target data asset can be produced, such as at 698 of FIG. 6. Target data assets can be produced, for example, as database tables, flat files, or other datasets.

Two examples are provided below. In Example 1, an ETL execution flow is shown that uses two source data assets and produces two target data assets. An explanation of key points in that example follows the example. In Example 2, a source prep flow is shown that uses two source prep assets.

Example 1 (Two Sources and Two Targets)

```
<?xml version="1.0" encoding="UTF-8" ?>
  <!DOCTYPE JobRowStepList>
  <JobFlowStepList
   xmlns:xsi="http://www.w3.org/2001/XMLSchema-instance"
   xsi:noNamespaceSchemaLocation="JobFlowStepList.xsd">
  <JobFlowStepList>
    <SourceAsset assetName="testAsset1"

commandType=DATASTAGE commandLine=
    "testAsset1Pull">
      <ControlList>
        <SourceAuditCountCheck mode="FILE"
        QCFile="/opt/Data/Data/Life/Input/PSA_Life_Post_
        IssQC.txt"/>
      </ControlList>
  </SourceAsset>
  <SourceAsset assetName="testAsset2">

<ControlList>
      <SourceAuditCountCheck mode="DATASET"
      QCFile="/opt/Data/Data/Life/Input/PSA_Life_Quotes_
      QC.txt"/>
    </ControlList>
  </SourceAsset>
```

```
<JobFlowSync maxTime="200">
<Target commandType=DATASTAGE commandLine="dsj_jzwhl11003_PSA_Life_PostIssue">
    <TargetAsset assetName="testAsset3">

<Reinitialize mode="DELETE" user="zw00000" />
      <ControlList>
        <TargetAuditCountCheck mode="File"/>
      </ControlList>
    </TargetAsset>

<TargetAsset assetName=testAsset4">
    </TargetAsset>
  </Target>
  <RemoveObject objectName="temp_PostIssue.ds"

objectType="DATASET"
    objectPath="/opt/ENT_DATA _Infrastructure/"
    scope="SUCCESS" />
</JobFlowStepList>
```

The following describes Example 1:

◇₁ This specifies that a source data asset, named "testAsset1", is needed. It is retrieved using a DataStage command named "testAsset1Pull". For this source data asset, it applies a SourceAuditCountCheck control. Note that testAsset1Pull had to produce the QC file for this audit control.

◇₂ This specifies that a source data asset, named "testAsset2", is needed. It is probably a DataStage dataset that was created in another Control-M job. For this source data asset, it applies a SourceAuditCountCheck control.

◇₃ In general, the ETL Flow Framework executes steps in parallel. Specifying JobFlowSync causes the ETL Flow Framework to wait until those two SourceAsset steps complete before continuing. If those steps take longer than 200 minutes, the ETL Flow Framework will terminate them. Please note that sequential execution could be forced by specifying SYNCH on the JobFlowStepList.

◇₄ This Target step executes a DataStage command to produce two target data assets. Note that it is executing after the two sources have completed because of the JobFlowSync.

◇₅ This specifies a target data asset named "testAsset3". Additionally, if the job is restarted, this asset will be reinitialized by deleting all rows for the restarted job's ETL Number. For this target, it applies a TargetAuditCountCheck control.

 This specifies a target data asset named "testAsset3". If the job is restarted, it will not be automatically reinitialized. There aren't any controls specified for this target data asset.

 This specifies an object that should be deleted for a successful completion of this flow. You do not have to precede this with a JobFlowSync since RemoveObject isn't done until wrap up processing.

Example 1 (Source Prep)

```
<?xml version="1.0" encoding="UTF-8" ?>
  <!DOCTYPE JobFlowStepList>
  <JobFlowStepList xmlns:xsi="http://www.w3.org/2001/
XMLSchema-instance" xsi:noNamespaceSchemaLoca-
tion=
    "JobFlowStepList.xsd">
  <JobFlowStepList>
    <SourcePrep commandLine="seq_jzwbk11057_Fixed_Term_subscr"
    commandType'2"DATASTAGE">
      <SourcePrepAsset assetName="spAsset1"

objectName="" objectPath="" objectType="FILE" >
        <ControlList>
          <FileIdentityCheck>
            <ignore>3</ignore>
          </FileIdentityCheck>
          <SourceAuditCountCheck mode=
            "FILECOUNT"qcFile="/opt/">
        </ControlList>
      </SourcePrepAsset>
      <SourcePrepAsset assetName="spAsset2"

objectName="" objectType="FILE">
        <ControlList>
          <FileIdentityCheck>
            <header>1</header>
          </FileIdentityCheck>
        </ControlList>
      </SourcePrepAsset>
    </SourcePrep>
    <RemoveObject objectType="DATASET"

objectPath="/opt/isproj/EntCoreData/Datasets"
      scope="SUCCESS"
      objectName="spAsset1.ds"/>
</JobFlowStepList>
```

The following describes Example 2:

 This specifies that a Source Prep flow is being executed. The data is prepared using a DataStage command named "some.datastagejob".

 This specifies that a source prep data asset, named "spAsset1", is needed. For this source prep data asset, it applies multiple controls: FileIdentityCheck SourceAuditCountCheck

 This specifies that a source prep data asset, named "spAsset2", is needed. For this source prep data asset, it applies a FileIdentityCheck control which ignores 1 line at the beginning of the FILE.

 This specifies an object that should be deleted for a successful completion of this flow.

Figure 7:
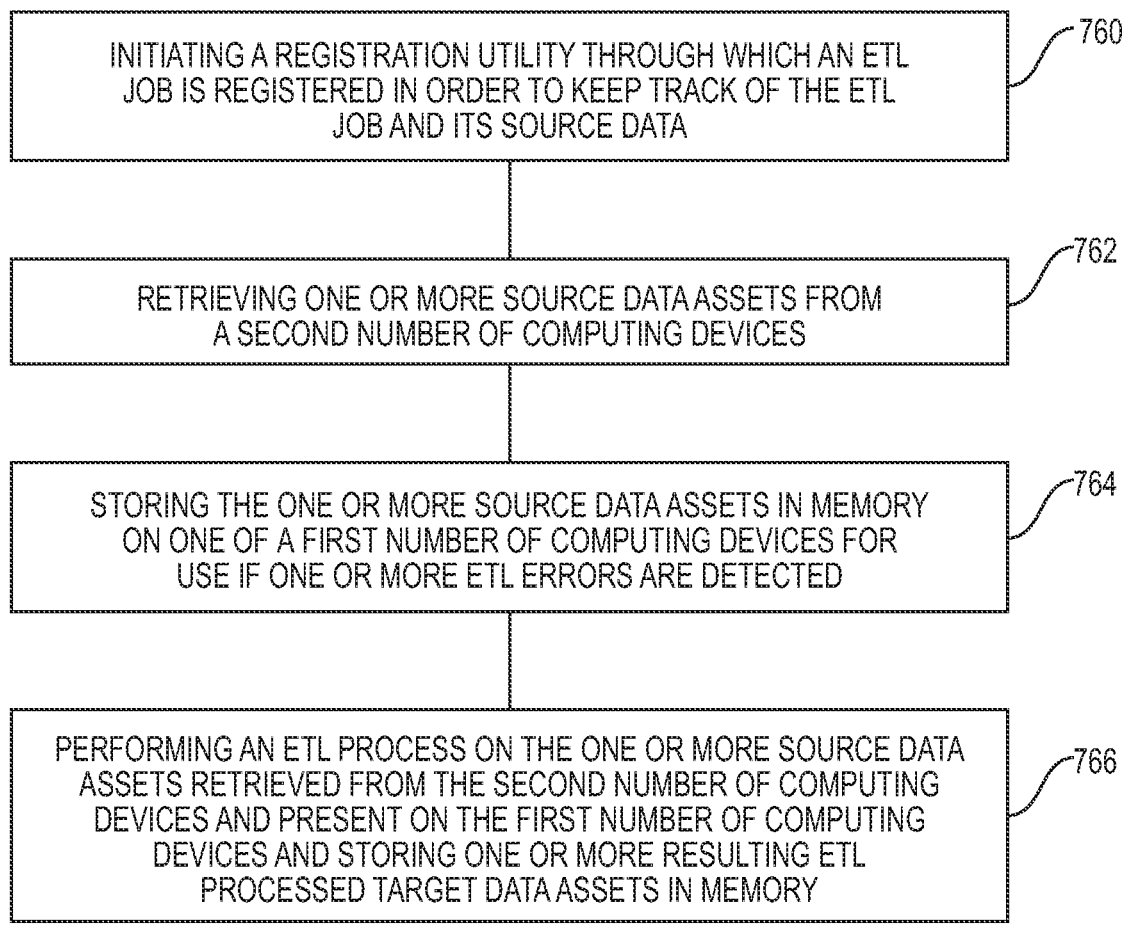
FIG. 7 illustrates a method according to one or more embodiments of the present disclosure.

FIG. 7 illustrates a method according to one or more embodiments of the present disclosure. The method can be performed by a system, such as, for example, system 100 previously described in connection with FIG. 1, among any other suitable systems. For instance, the method can be accomplished by system 100 wherein computing device 102 is within a first number of computing devices having processors and memory thereon for the storage of executable instructions and data, wherein the instructions are executed to perform a method such as that illustrated in FIG. 7.

Data assets as used herein can, for example, be a relational table, a sequential flat file, or a database dataset. In some embodiments, data assets can be defined in a data asset definition table that can be used to aid in the tracking of the source and target data assets. Information that can be included in the table includes a data asset identifier (e.g., name), a physical path, a physical identifier (e.g., name), an owner identifier (e.g., name), a system identifier (e.g., name), a data asset structure type, a version identifier (e.g., number), a data asset refresh frequency (e.g., daily, weekly, etc.), a retention policy type (e.g., no purge, date, number of versions to keep, etc.), and/or a retention period definition (e.g., daily, weekly, etc.), among other data asset related information that may be useful to a user of the ETL complexity management framework and/or useful to the functioning of the framework.

The method of FIG. 7 includes initiating a registration utility through which an ETL job is registered in order to keep track of the ETL job and its source data, at block 760. In some embodiments, initiating a registration utility through which an ETL job is registered in order to keep track of the ETL job and its source data can include generating at least one table selected from the group including: a job definition table, a latest available asset table, and a data asset dependency table.

A job definition table can, for example, include information about the job such as a job identifier (e.g., name), a classification code (e.g., standard ETL, reconciliation, synchronization, initial load, error processing, infrastructure, etc.), and job description, an application identifier (e.g., name), and/or an owner identifier (e.g., name) among other job related information that may be useful to a user of the ETL complexity management framework and/or useful to the functioning of the framework.

A latest available asset table can, for example, include information about the status of assets so that a selection of the latest available asset can be made. For example, the information can include data asset identifier (e.g., name), an ETL identifier (e.g., number), a latest available date (e.g., date asset became available to the system), an asset effective date (e.g., date of the data in this version), and/or an asset active indicator (e.g., indicator regarding which data should be used or is valid or invalid, etc.), among other latest available asset information that may be useful to a user of the ETL complexity management framework and/or useful to the functioning of the framework.

A data asset dependency table can, for example, include information about the dependency of assets such as the relation between a job definition and the assets the job uses as sources and/or targets. For example, the information can include target data asset identifier (e.g., name), source data asset identifier (e.g., name), job identifier (e.g., name), data asset version identification type (e.g., mechanism by which a version identifier can be identified or referenced), relationship to other source or target data assets, among other data asset dependency information that may be useful to a user of the ETL complexity management framework and/or useful to the functioning of the framework.

The framework information (e.g., provided in the tables discussed above) can be used to allow the ETL complexity management framework to track and/or manage the data assets of the system. For example, by tracking a job and the ETL processes related to data assets within a job, the complexity of ETL management can be better handled than when the tasks are managed based on each ETL data conversion task.

Further, by archiving source data assets on the first number of computing devices, when an error is identified, the source used can be located and the error analysis can be conducted outside of the second number of computing devices. Additionally, this information allows for versions and/or dependencies to be identified and used in error analysis of the data assets.

For example, in block 762, the method includes retrieving one or more source data assets from a second number of computing devices. In this example, the second number of computing devices can be computing devices 120-1, 120-2, 120-3, 120-4, and 120-5 of FIG. 1.

And, the method of FIG. 7 includes storing the one or more source data assets in memory on one of a first number of computing devices for use if one or more ETL errors are detected, at block 764.

Block 766 of the method embodiment of FIG. 7 includes performing an ETL process on the one or more source data assets retrieved from the second number of computing devices and present on the first number of computing devices and storing one or more resulting ETL processed target data assets in memory. This storage can be done on any of the computing devices or memory locations on the system.

In some embodiments, the method can include performing one or more quality checks such as performing a file identity check to determine whether an old version of a source data asset was retrieved and/or used instead of a new source data asset. A file identity check can, for example, be a checksum calculation for a file, among other suitable mechanisms that may be used for verifying a file identity.

Another mechanism for performing one or more quality checks can include performing an audit count check to compare a tally of the source data assets stored in memory with a tally of the source data assets received from the number of second computing devices. In some embodiments, performing an audit count check can include comparing a tally of records written to a target data asset and a tally of records discarded to a tally of records of the source data assets received from the number of second computing devices. In various embodiments, the method can include performing one or more quality checks on the target data assets to determine if one or more ETL errors are detected.

In some embodiments, the first number of computing devices have instructions that are executed to determine one or more data source assets in which one or more target data assets are dependent upon and to store one or more dependency indicators in memory. Such embodiments can be beneficial, for example, in identifying where errors identified in the transformation of a source data asset to a target data asset may be have affected other target data assets even if an error has not been identified by testing, among other benefits.

Some methods include instructions that are executed to determine which one or more versions of the one or more source data assets to use in producing the one or more target data assets and to store one or more source version indicators in memory. Such embodiments can be beneficial, for example, in identifying whether a source that has been extracted is the correct version, whether a new or old version is being extracted, and/or to identify which source was used to create one or more target data assets, among other benefits.

Figure 8:
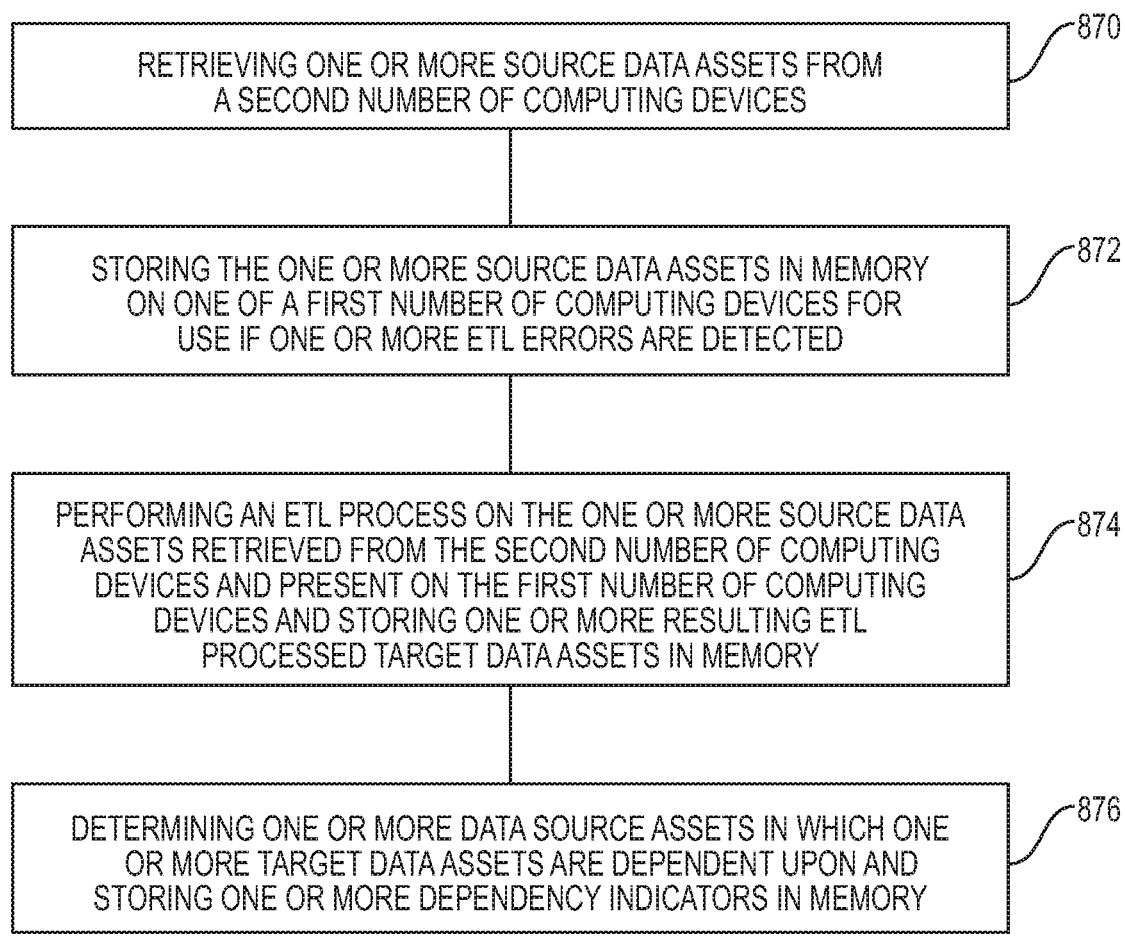
FIG. 8 illustrates another method according to one or more embodiments of the present disclosure.

FIG. 8 illustrates another method according to one or more embodiments of the present disclosure. As with the method of FIG. 7, this method can be performed by a system, such as, for example, system 100 previously described in connection with FIG. 1.

The embodiment of FIG. 8 includes retrieving one or more source data assets from a second number of computing devices, at block 870. At block 872, the method includes storing the one or more source data assets in memory on one of a first number of computing devices for use if one or more ETL errors are detected.

The method of FIG. 8 also includes performing an ETL process on the one or more source data assets retrieved from the second number of computing devices and present on the first number of computing devices and storing one or more resulting ETL processed target data assets in memory, at block 874.

Block 876 of the method embodiment of FIG. 8 includes determining one or more data source assets in which one or more target data assets are dependent upon and storing one or more dependency indicators in memory. Such embodiments can be beneficial, for example, by identifying relationships to other data assets that may be the cause or may be affected by the errors identified, among other benefits.

In some embodiments, methods can include executing instructions to test one or more of the target data assets to identify if one or more data execution errors occur. If a data execution error occurs, methods can include executable instructions for storing an aborted job in memory on one or more of the first number of computing devices. In various embodiments, a method can include storing one or more error return codes in memory on one or more of the first number of computing devices if one or more data execution errors occur. Such information can be helpful in tracing the origin of an error among other benefits.

In various embodiments, methods can include removing one or more temporary files associated with the test of the one or more target data assets. Methods can also include removing one or more temporary data entries associated with the test of the one or more target data assets. Such functions may then allow the system to restart or reinitialize an ETL process.

In some embodiments, instructions can be executed to define a schedule for purging the source data assets stored in memory. This can, for example, be accomplished by utilizing the retention policy information in the data asset definition table described above.

In various embodiments, instructions can be executed to determine which one or more versions of the one or more target data assets have been made available to users and to store one or more target version indicators in memory. This can, for example, be accomplished by utilizing the version information discussed with respect to the tables described above.

Figure 9:
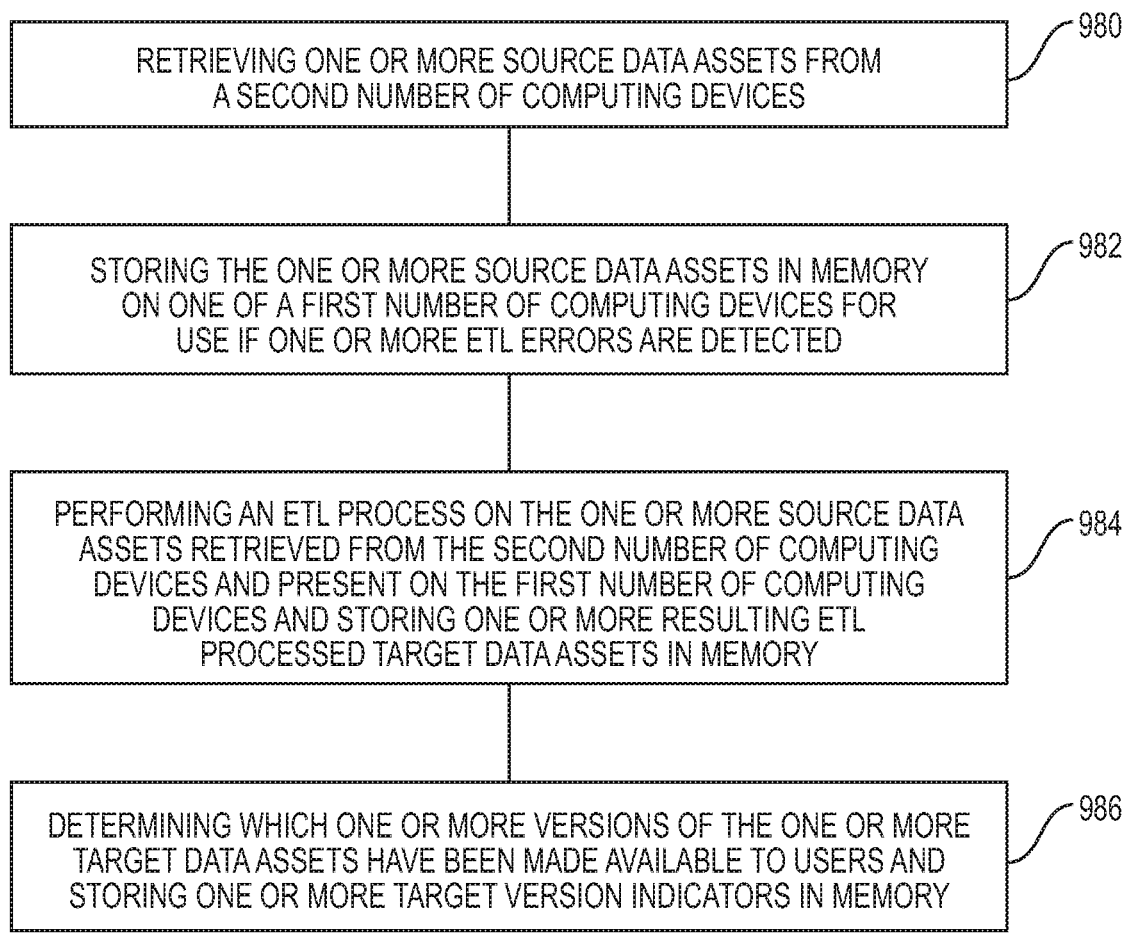
FIG. 9 illustrates another method according to one or more embodiments of the present disclosure.

FIG. 9 illustrates another method according to one or more embodiments of the present disclosure. As with the method of FIG. 8, this method can be performed by a system, such as, for example, system 100 previously described in connection with FIG. 1.

The embodiment of FIG. 9 includes retrieving one or more source data assets from a second number of computing devices, at block 980. Block 982 includes storing the one or more source data assets in memory on one of a first number of computing devices for use if one or more ETL errors are detected.

The method also includes performing an ETL process on the one or more source data assets retrieved from the second number of computing devices and present on the first number of computing devices and storing one or more resulting ETL processed target data assets in memory, at block 984. The method of FIG. 9 also includes determining which one or more versions of the one or more target data assets have been made available to users and storing one or more target version indicators in memory, at block 986. This can, for example, be accomplished by utilizing the version information discussed with respect to the tables described above.

In some embodiments, the method can include initiating a registration utility through which an ETL job is registered in order to keep track of the ETL job and its source data and includes assigning an ETL job identifier to the ETL job and in including the ETL job identifier as data in at least one of the target data assets. In various embodiments, the job registration process can include the filling out of one or more informational tables, such as those discussed above.

Methods can also include testing one or more of the target data assets to identify if one or more data execution errors occur and if, one or more errors are identified, referencing information regarding data to be deleted in one or more of the target assets based upon the job identifier and deleting the data referenced. For instance, testing can include testing one or more of the target data assets to identify if one or more data execution errors occur and if, one or more errors are identified, deleting rows in one or more of the target assets.

In some embodiments a method can include performing one or more quality checks on the target data assets to determine if one or more ETL errors are detected and wherein at least one of the quality checks performed includes a source threshold check which validates a quality rule against a defined threshold error. A source threshold check can, for example, be a source data asset row count that indicates whether the source row quantity is more than plus or minus 10% different than the previous version. Such a quality check may be beneficial in identifying whether the data has been substantially changed before the ETL process is begun, among other benefits.

Another example method includes managing one or more processes providing extract, transform, and load (ETL) application complexity management wherein the method defines an ETL job definition, defines a data asset definition, defines a data asset dependency definition, receives an ETL flow to provide execution of one or more ETL flow steps, provides retrieval of data from a source data asset, applies a data control to the source asset data, if available, and produces an ETL job registration, a data asset status, a latest asset available date, a data asset consumer identifier, and a target data asset based on at least one of the ETL job definition, the data asset definition, the data dependency definition, and the source asset data.

In some such embodiments, the method can include recognizing when it is a necessity to restart and re-initialize target assets based on the execution of the ETL flow steps. Some embodiments utilize a method that includes storing data asset consumer information about particular ETL job runs in an electronic storage media.

In various embodiments, applying the data control can, for example, cause at least one of a file identity check, an audit count check, a threshold data check, and automatic archiving of source data to occur. Executing at least two ETL flow steps is accomplished in parallel in some implementations. Executing the ETL flow steps can be accomplished in parallel and is synchronized based on ETL flow scripts.

Another example method embodiment includes managing one or more processes providing extract, transform, and load (ETL) application complexity management including receiving one or more data asset incidents associated with a particular data asset, one or more data asset consumers associated with the particular data asset, and one or more data asset statuses associated with the particular data asset. The method also includes producing a roll back plan to remove the effect of one or more source data assets from one or more target data asset consumers, executing the roll back plan, and replacing one or more subsets of target data assets, each containing at least one data item, with corrected data.

In some such embodiments, the roll back plan can be reviewed prior to execution. This can be accomplished via a computing device user or via computing device executable instructions or a combination of these.

In some embodiments, the method includes replacing one or more subsets of target data assets, each containing at least one data item, with corrected data removes the effects of errant data. In various embodiments, the removal of the effects of errant data can be accomplished, for example, by recalculating totals and counts within one or more data sets.

The removal of the effects of errant data can be accomplished, for example, by removing a subset of one or more target data assets. The removal of the effects of errant data can also be accomplished, for example, by providing corrected data to the target data asset to replace a subset of data in one or more consuming target data assets.

In some embodiments, providing corrected data to the target data asset to replace a subset of data in one or more consuming target data assets can be accomplished, for example, by the recalculating totals and counts within one or more data sets. Providing corrected data to the target data asset to replace a subset of data in one or more consuming target data assets can also be accomplished, for example, by inserting the corrected data into one or more consuming target data assets. Providing corrected data to the target data asset to replace a subset of data in one or more consuming target data assets can be accomplished, for example, by inserting the corrected data into one or more consuming target data assets corrects all subsequent consuming target assets.

In various embodiments, the consuming target assets are consumed by one or more subsequent consuming target data assets. As used herein, consuming target assets are those assets which are using data from a data asset.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Additionally, the order of method steps should not be viewed as limiting and any suitable order of step can be utilized.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer-implemented method of providing extract, transform, and load (ETL) application complexity management, the method comprising:
   receiving, from a source system, a source data asset at a data processing system, the source data asset having a first data format;
   initiating a transformation of the source data asset to a target data asset using the data processing system, the target data asset having a second data format different than the first data format, wherein initiating the transformation comprises executing an ETL job;
   determining that an error occurred with respect to the execution of the ETL job during execution of the ETL job;
   responsive to determining that the error occurred with respect to the execution of the ETL job during execution of the ETL job:
   terminating the execution of the ETL job,
   identifying one or more modifications to the target data asset due to the execution of the ETL job,
   reversing the one or more modifications to the target data asset, and
   re-executing the ETL job.

2. The method of claim 1, wherein reversing the one or more modifications to the target data asset comprises removing data inserted into the target data asset during execution of the ETL job.

3. The method of claim 2, wherein removing data inserted into the target data asset comprises removing one or more rows of data inserted into the target data asset during execution of the ETL job.

4. The method of claim 1, wherein reversing the one or more modifications to the target data asset comprises reversing a modification to an end date associated with the target data asset.

5. The method of claim 1, wherein reversing the one or more modifications to the target data asset comprises reversing a modification to a flag associated with the target data asset.

6. The method of claim 1, wherein initiating the transformation of the source data asset to a target data asset comprises registering the ETL job by generating a data asset dependency table, wherein the data asset dependency table comprises data indicating a relation between a job definition associated with the ETL job, the source data asset, and the target data asset.

7. The method of claim 1, wherein initiating the transformation comprises performing one or more quality checks with respect to the source data asset and/or the target asset.

8. The method of claim 1, wherein performing one or more quality checks comprises:
   determining a version of the source data asset, and
   determining whether the version of the source data asset corresponds to a most recent version of the source data asset.

9. The method of claim 1, wherein performing one or more quality checks comprises:
   determining a number of data records written to the target data asset, a number of data records discarded from the target data asset, and a number of data records in the source data asset, and
   comparing the number of data records written to the target data asset and the number of data records discarded from the target data asset to the number of data records in the source data asset.

10. A non-transitory computer-readable medium including one or more sequences of instructions which, when executed by one or more processors, causes:
    receiving, from a source system, a source data asset at a data processing system, the source data asset having a first data format;
    initiating a transformation of the source data asset to a target data asset using the data processing system, the target data asset having a second data format different than the first data format, wherein initiating the transformation comprises executing an ETL job;
    determining that an error occurred with respect to the execution of the ETL job during execution of the ETL job;
    responsive to determining that the error occurred with respect to the execution of the ETL job during execution of the ETL job:
    terminating the execution of the ETL job,
    identifying one or more modifications to the target data asset due to the execution of the ETL job,
    reversing the one or more modifications to the target data asset, and
    re-executing the ETL job.

11. The non-transitory computer-readable medium of claim 10, wherein reversing the one or more modifications to the target data asset comprises removing data inserted into the target data asset during execution of the ETL job.

12. The non-transitory computer-readable medium of claim 11, wherein removing data inserted into the target data asset comprises removing one or more rows of data inserted into the target data asset during execution of the ETL job.

13. The non-transitory computer-readable medium of claim 10, wherein reversing the one or more modifications to the target data asset comprises reversing a modification to an end date associated with the target data asset.

14. The non-transitory computer-readable medium of claim 10, wherein reversing the one or more modifications to the target data asset comprises reversing a modification to a flag associated with the target data asset.

15. The non-transitory computer-readable medium of claim 10, wherein initiating the transformation of the source data asset to a target data asset comprises registering the ETL job by generating a data asset dependency table, wherein the data asset dependency table comprises data indicating a relation between a job definition associated with the ETL job, the source data asset, and the target data asset.

16. The non-transitory computer-readable medium of claim 10, wherein initiating the transformation comprises performing one or more quality checks with respect to the source data asset and/or the target asset.

17. The non-transitory computer-readable medium of claim 10, wherein performing one or more quality checks comprises:
   determining a version of the source data asset, and
   determining whether the version of the source data asset corresponds to a most recent version of the source data asset.

18. The non-transitory computer-readable medium of claim 10, wherein performing one or more quality checks comprises:
   determining a number of data records written to the target data asset, a number of data records discarded from the target data asset, and a number of data records in the source data asset, and
   comparing the number of data records written to the target data asset and the number of data records discarded from the target data asset to the number of data records in the source data asset.

19. A system comprising:
   one or more processors;
   a non-transitory computer-readable medium including one or more sequences of instructions which, when executed by the one or more processors, causes:
   receiving, from a source system, a source data asset at a data processing system, the source data asset having a first data format;
   initiating a transformation of the source data asset to a target data asset using the data processing system, the target data asset having a second data format different than the first data format, wherein initiating the transformation comprises executing an ETL job;
   determining that an error occurred with respect to the execution of the ETL job during execution of the ETL job;
   responsive to determining that the error occurred with respect to the execution of the ETL job during execution of the ETL job:
   terminating the execution of the ETL job,
   identifying one or more modifications to the target data asset due to the execution of the ETL job,
   reversing the one or more modifications to the target data asset, and
   re-executing the ETL job.

20. The system of claim 19, wherein reversing the one or more modifications to the target data asset comprises removing data inserted into the target data asset during execution of the ETL job.

21. The system of claim 20, wherein removing data inserted into the target data asset comprises removing one or more rows of data inserted into the target data asset during execution of the ETL job.

22. The system of claim 19, wherein reversing the one or more modifications to the target data asset comprises reversing a modification to an end date associated with the target data asset.

23. The system of claim 19, wherein reversing the one or more modifications to the target data asset comprises reversing a modification to a flag associated with the target data asset.

24. The system of claim 19, wherein initiating the transformation of the source data asset to a target data asset comprises registering the ETL job by generating a data asset dependency table, wherein the data asset dependency table comprises data indicating a relation between a job definition associated with the ETL job, the source data asset, and the target data asset.

25. The system of claim 19, wherein initiating the transformation comprises performing one or more quality checks with respect to the source data asset and/or the target asset.

26. The system of claim 19, wherein performing one or more quality checks comprises:
   determining a version of the source data asset, and
   determining whether the version of the source data asset corresponds to a most recent version of the source data asset.

27. The system of claim 19, wherein performing one or more quality checks comprises:
   determining a number of data records written to the target data asset, a number of data records discarded from the target data asset, and a number of data records in the source data asset, and
   comparing the number of data records written to the target data asset and the number of data records discarded from the target data asset to the number of data records in the source data asset.

* * * * *